(12) United States Patent
Major, Jr. et al.

(10) Patent No.: US 11,130,537 B1
(45) Date of Patent: Sep. 28, 2021

(54) SYSTEM AND METHOD FOR REPOWERING A PERSONAL TRANSPORT VEHICLE TO CONVERT FROM ELECTRIC MOTOR POWER TO INTERNAL COMBUSTION ENGINE POWER

(71) Applicant: Advanced Datum Inc., Rush City, MN (US)

(72) Inventors: Michael Major, Jr., Keystone, CO (US); Joseph Allen Wegleitner, Stacy, MN (US); Jacob Christopher Denison, Osceola, WI (US)

(73) Assignees: Michael Major, Jr., Keystone, CO (US); Joseph Allen Wegleitner, Stacy, MN (US)

( * ) Notice: Subject to any disclaimer, the term of this patent is extended or adjusted under 35 U.S.C. 154(b) by 98 days.

(21) Appl. No.: 16/217,871

(22) Filed: Dec. 12, 2018

Related U.S. Application Data

(60) Provisional application No. 62/598,034, filed on Dec. 13, 2017.

(51) Int. Cl.
| | |
|---|---|
| *B62D 65/10* | (2006.01) |
| *B62D 65/12* | (2006.01) |
| *B60K 17/06* | (2006.01) |
| *B62D 65/16* | (2006.01) |
| *B60K 1/00* | (2006.01) |
| *B60K 17/16* | (2006.01) |

(52) U.S. Cl.
CPC ............. *B62D 65/10* (2013.01); *B60K 1/00* (2013.01); *B60K 17/06* (2013.01); *B60K 17/165* (2013.01); *B62D 65/12* (2013.01); *B62D 65/16* (2013.01)

(58) Field of Classification Search
CPC ...................................................... B62D 65/10
See application file for complete search history.

(56) References Cited

U.S. PATENT DOCUMENTS

| | | | | |
|---|---|---|---|---|
| 2,754,015 | A | * | 7/1956 | Lee ........................ E21F 13/025 414/528 |
| 2017/0040915 | A1 | * | 2/2017 | Krolak .................... B60L 15/38 |
| 2018/0022387 | A1 | * | 1/2018 | Ta ............................. B60K 1/04 180/291 |

OTHER PUBLICATIONS

Michael Fernie, The Importance of Oil Cooling and Why you Need to Take it Seriously, CarThrottle, https://www.carthrottle.com/post/the-importance-of-oil-cooling-and-why-you-need-to-take-it-seriously/, Screen shot captured on Sep. 7, 2016 (Year: 2016).*
Wikipedia, Throttle, https://en.wikipedia.org/wiki/Throttle, Screen shot captured on Nov. 11, 2016 (Year: 2016).*

* cited by examiner

*Primary Examiner* — Moshe Wilensky
*Assistant Examiner* — Kyle A Cook
(74) *Attorney, Agent, or Firm* — Boyle Fredrickson, S.C.

(57) ABSTRACT

A system and method are provided for repowering an electric motor-powered PTV to convert it into an engine-powered PTV. The system includes a power unit with an ICE, an integrated CVT, and an integrated forward/reverse gearbox. An adapter system includes an adapter geartrain that includes a transmission intermediate gear that is configured to overdrive a transmission output shaft. The transmission output shaft may be internally splined.

5 Claims, 5 Drawing Sheets

SYSTEM AND METHOD FOR REPOWERING A PERSONAL TRANSPORT VEHICLE TO CONVERT FROM ELECTRIC MOTOR POWER TO INTERNAL COMBUSTION ENGINE POWER

CROSS-REFERENCE TO RELATED APPLICATION

This application claims the benefit of U.S. Provisional Patent Application Ser. No. 62/598,034, filed on Dec. 13, 2017, the entirety of which is expressly incorporated by reference herein.

FIELD OF THE INVENTION

The present invention relates generally to four-wheeled personal transport vehicles and, more specifically, to a system and method of repowering a personal transport vehicle by converting it from being powered by an electrical motor to being powered by an internal combustion engine.

BACKGROUND OF THE INVENTION

Four-wheeled PTVs (personal transport vehicles) are well known and are continuing to increase in popularity. PTVs are either engine-powered PTVs with ICEs (internal combustion engines) or electric motor-powered PTVs with electric motors that respectively deliver the power for moving the PTVs. Regardless of the particular type of power delivery, PTVs are small non-straddle vehicles used mostly for transporting people or relatively light loads at relatively slow speeds. Popular examples include golf carts and the like which typically carry people through not only golf courses, but also through large buildings such as manufacturing facilities, airports, as well as off-road trails and, at times, roads or streets at slow speeds.

A typical engine-powered PTV has a transmission system with a CVT (continuously variable transmission) that includes a pair of clutches connected by a CVT belt. The pair of clutches includes a primary clutch that is rotated by the ICE and a secondary clutch that is connected to the primary clutch by the CVT belt and that delivers torque to a transaxle. The transaxle of an engine-powered PTV is relatively large and complex, with a transaxle gearbox that has forward and reverse gears so that forward and reverse travel directions are selected through the transaxle of a typical engine-powered PTV.

A typical electric-powered PTV has a powertrain that is much simpler than that of an engine-powered PTV. The reason is that an electric motor-powered PTV directly drives the transaxle, without intervening clutches and belts. Forward and reverse direction changes in an electric motor-powered PTV are achieved by changing rotational direction of the electric motor's output shaft. The electric motor-powered PTV's transaxle is simpler too, lacking a forward and reverse gearbox like that needed in an engine-powered PTV.

Both engine-powered and electric motor-powered PTVs offer advantages. Some users are more familiar with ICE powered vehicles than electric vehicles and prefer engine-powered PTVs because they are accustomed to the technology. Other users prefer the greater power output of engine-powered PTVs over typical electric motor-powered PTVs, which allows for accessories like larger tires, lift kits to fit the larger tires, heavy vehicle-mounted accessories, and greater payload capacities. Notwithstanding these benefits of engine-powered PTVs, substantially more new electric motor-powered PTVs are sold than engine-powered PTVs, Electric motor-powered PTV advantages may include reduced maintenance, simpler operation, and less noise than with engine-powered PTVs.

Although new electric motor-powered PTVs substantially outsell engine-powered PTVs, the secondary, or used market, shows the opposite with engine-powered PTVs retaining far higher resale values. One reason is that electric motor-powered PTVs require a substantial service task(s) after about four years of use. At that time, the batteries, which are typically lead-acid batteries, degrade to the point of needing replacement. Batteries are expensive to replace, and the replacement is typically done by dealers or professional shops. That is because many users do not want to handle the numerous heavy batteries or concern themselves with proper disposal. Furthermore, most purchasers of new electric motor-powered PTVs are commercial users with robust electrical charging systems at their facilities for charging the batteries of the electric motor-powered PTVs, whereas most individuals or non-commercial users lack sufficient charging infrastructure at their homes.

Even though there are numerous unwanted used electric motor-powered PTVs that need, for example, battery replacement, attempts to repower them with ICEs have proven impractical. The powertrains of electric motor-powered PTVs and engine-powered PTVs are incompatible since, for example, the electric motor-powered PTVs have no reversing mechanism since their electric motors directly drive a transaxle that has no forward/reverse gearbox. Other challenges to repowering an electric motor-powered PTV with an ICE include trying to mount ICE accessory-type components, such as an oil cooling system and an exhaust system.

SUMMARY OF THE INVENTION

A system and method are provided for repowering an electric motor-powered PTV to convert it into an engine-powered PTV. The system includes a power unit with an ICE, an integrated CVT, and an integrated forward/reverse gearbox. An adapter system includes an adapter geartrain that includes a transmission intermediate gear that is configured to overdrive a transmission output shaft. The transmission output shaft may be internally splined.

According to one aspect of the invention, a repowering system is provided for repowering an electric motor-powered personal transport vehicle with an internal combustion engine. The repowering system includes a power unit with an ICE (internal combustion engine) and the power unit may include a CVT (continuously variable transmission) that receives power from the ICE. The power unit also includes a forward/reverse gearbox, such as an integral forward reverse gearbox, that receives power from the CVT and defines forward and reverse shift states for providing forward and reverse travel directions. A transmission output shaft extends from the forward/reverse gearbox and rotates in forward and reverse directions that correspond to the forward and reverse shift states of the forward/reverse gearbox. A transaxle delivers power from the power unit to a pair of drive wheels. A transaxle input shaft receives power the transmission output shaft.

According to another aspect of the invention, the transaxle has an integral electric motor mounting arrangement configured to support an electric motor for directly driving the transaxle, and the power unit may be connected to the electric motor-mounting arrangement.

According to another aspect of the invention, an adapter system may be arranged between the power unit and the electric motor-mounting arrangement of the transaxle. In this way, the adapter system may provide the connection between the power unit and the transaxle, According to another aspect of the invention, the transaxle input shaft faces a first direction when the transaxle is in a pre-repowered or electric motor-powered state and a second direction when the transaxle is in a post-repowered or engine-powered state. The first and second directions may be opposite transverse directions with respect to a centerline of the personal transport vehicle so the transaxle input shaft may face opposite directions before and after repowering. The first direction faces toward a passenger side of the personal transport vehicle. The second direction faces toward a driver side of the personal transport vehicle.

According to another aspect of the invention, the transmission output shaft may be internally splined. The transaxle input shaft may be externally splined, and it may be received in the internally-splined transmission output shaft.

According to another aspect of the invention, the forward/reverse gearbox includes an intermediate gear that delivers power to the transmission output shaft gear. The intermediate gear may have a larger diameter than a diameter of the transmission output shaft gear so that the forward/reverse gearbox overdrives the transmission output shaft, whereby the power unit may provide an overdrive output ratio.

According to another aspect of the invention, the forward/reverse gearbox may define a gearbox housing, and the transmission output shaft may extend outwardly beyond the gearbox housing. The transaxle may include a transaxle housing with an input section, and the transaxle input shaft may be recessed in the transaxle housing input section. The transmission output shaft may extend into the transaxle housing input section to deliver power to the transaxle input shaft.

According to another aspect of the invention, an adapter plate may be arranged between the forward/reverse gearbox and the transaxle. The forward/reverse gearbox may define a gearbox housing. The transaxle may include a transaxle housing with an input section. The adapter plate may define an adapter plate passage and it may interconnect the forward/reverse gearbox housing and the transaxle housing input section to each other. The transmission output shaft may extend through the adapter plate passage. The adapter plate may have a bearing holder with a bearing that supports the transmission output shaft for rotation.

According to another aspect of the invention, a personal transport vehicle is provided with a power unit that includes an internal combustion engine and an integrated forward/reverse gearbox. A transaxle receives power from the forward/reverse gearbox of the power unit.

According to another aspect of the invention, a method is provided for repowering a personal transport vehicle to convert it from being electric motor powered to being powered with an internal combustion engine power. The method includes removing an electric drive motor from an electric motor-powered personal transport vehicle. A transaxle is removed from the personal transport vehicle and may be removed in one piece, along with its axle. The transaxle may define a first position as an original orientation for receiving power from the electric drive motor. The reorientation arranges the transaxle in a second position as a repowered orientation. A power unit that includes an internal combustion engine is connected to the transaxle when the transaxle is in the second position.

According to another aspect of the invention, reorienting the transaxle includes rotating the transaxle in a yaw-direction about a vertical axis. This rotates the transaxle to face an opposite direction after the reorienting.

According to another aspect of the invention, the brake system may be removed and reinstalled in the same orientation with respect to the chassis, even though the transaxle is rotated to an opposite orientation. The brake system includes a left brake unit arranged at the driver side of the personal transport vehicle and a right brake unit arranged at the passenger side of the personal transport vehicle. The brake system is reinstalled on the same side as it was before reorienting the transaxle with the left brake unit at the driver side of the personal transport vehicle and the right brake unit at the passenger side of the personal transport vehicle.

According to another aspect of the invention, the power unit is attached to the chassis of the personal transport vehicle, which may include independently attaching an engine unit mounting member to the chassis. The power unit and its mounting member may be pivoted about an axle of the transaxle to align corresponding connectors or mounting features of the power unit and transaxle for making the connection.

According to another aspect of the invention, transmission controls may be installed for selecting a transmission output shaft rotational direction for providing forward and reverse travel directions of the personal transport vehicle.

According to another aspect of the invention, an engine oil cooling system mount may be installed to support, for example, an oil cooler of the oil cooling system from the chassis.

According to another aspect of the invention, an exhaust system mount may be installed to support, for example, a muffler of the exhaust system from the chassis.

According to another aspect of the invention, an engine load control may be connected to the electric motor speed control so that the engine speed is controlled with the existing accelerator pedal.

Figure 1:
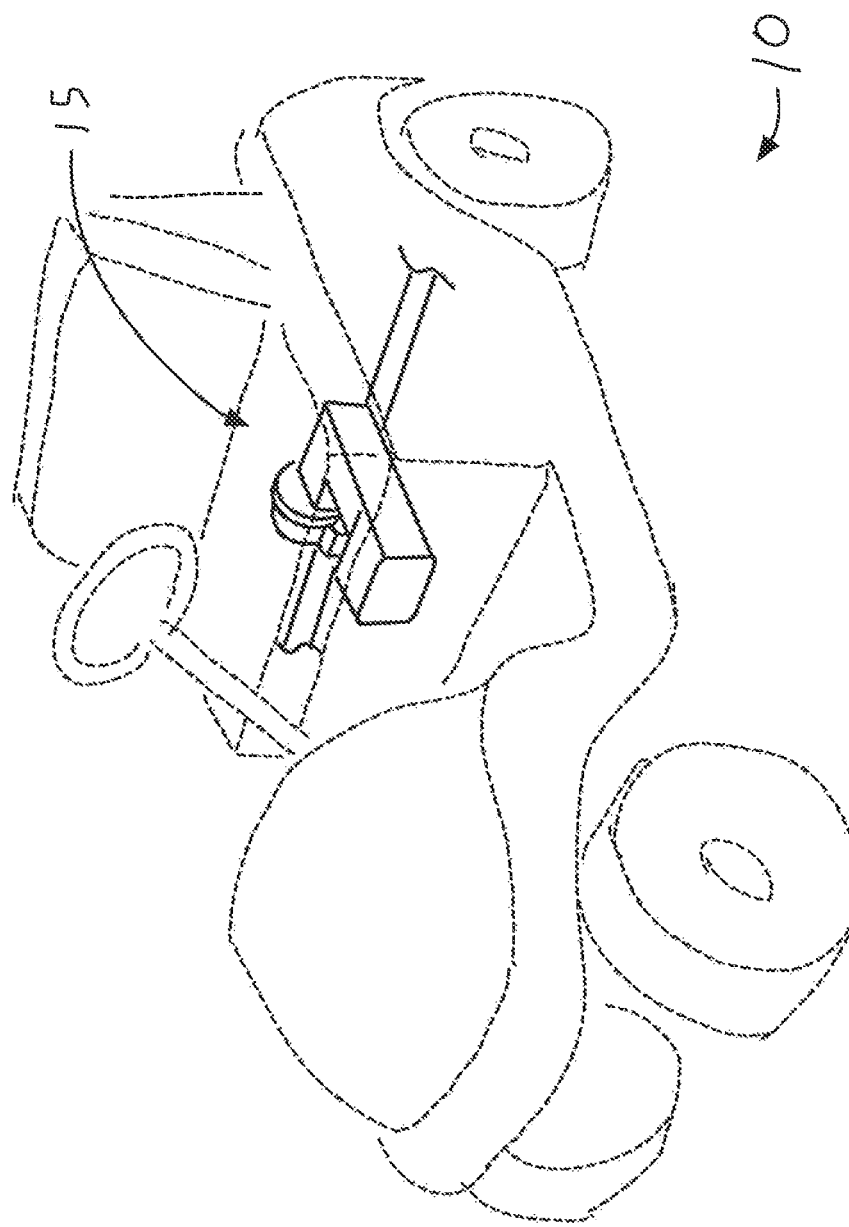
FIG. 1 is a simplified pictorial view of a conversion system for repowering a PTV (personal transport vehicle) from electric motor power to internal combustion engine power according to the invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purposes of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Referring now to FIG. 1, a PTV (personal transport vehicle) is shown as a golf-cart type of PTV 10, although it is understood that it may be another type(s) of PTV that may have been repowered with a conversion system 15. Before repowering with conversion system 15, PTV 10 was an electric motor-powered PTV 10a (FIG. 2) and, after repowering, PTV 10 is an engine-powered PTV 10b (FIG. 3) that is powered with an ICE (internal combustion engine).

Figure 2:
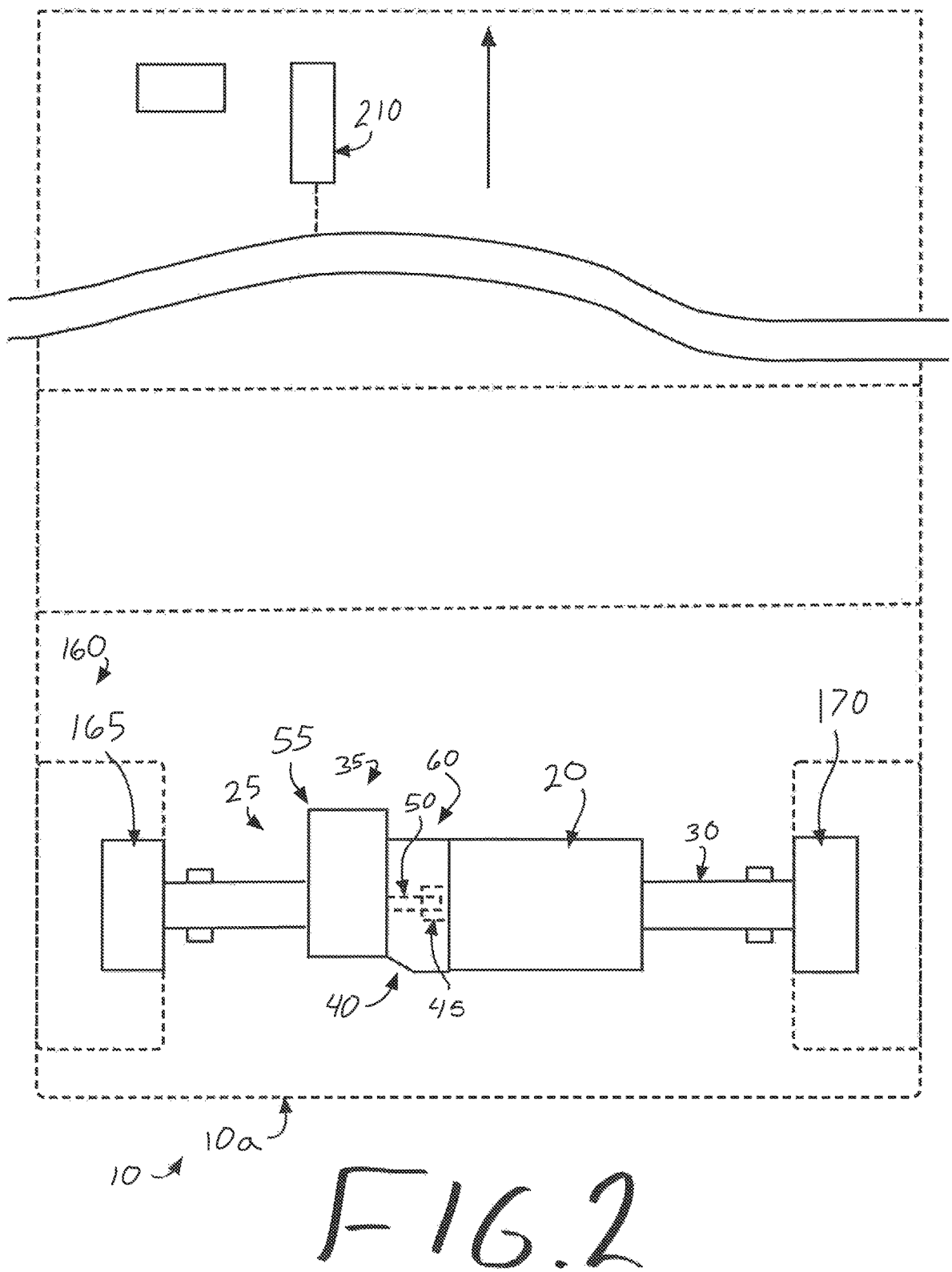
FIG. 2 is a simplified schematic representation of a PTV in a pre-repowered configuration that is powered with an electric motor.

Referring now to FIG. 2, in its pre-repowered configuration, the electric motor-powered PTV includes various powertrain components that are mounted at least partially under the PTV's seat and includes a battery system (not shown) that may include multiple batteries in a battery bank that provides electrical power to an electric motor 20. Electric motor 20 may be directly mounted to transaxle 25 that is shown here as a unit of integrated components that includes axle 30, transaxle gearbox 35, and electric motor-mounting arrangement 40, although it is understood that these various components may be implemented separately as discrete independent components. Electric motor-mounting arrangement 40 is configured to support electric motor 20 for directly driving the transaxle 25. Electric motor-mounting arrangement 40 may include a collar that receives an end of the electric motor 20 or a lip at the end of electric motor 20, Mounting bosses or a mounting flange of electric motor-mounting arrangement 40 may have bores that align with threaded bores in the electric motor's 20 housing or a case to receive fasteners to directly connect electric motor 20 to electric motor-mounting arrangement 40 so that electric motor output shaft 45 can couple to transaxle input shaft 50. Transaxle 25 includes a transaxle housing 55 with an input section 60, and the electric motor-mounting arrangement 40 may be defined at the transaxle housing input section 60.

Still referring to FIG. 2, in the electric motor-powered PTV 10a configuration, transaxle 25 is in a first position with a first orientation. In this first orientation, the transaxle input shaft 50 faces a first direction such as transversely with respect to a centerline of the PTV 10, shown facing toward a passenger side of PTV 10.

Figure 3:
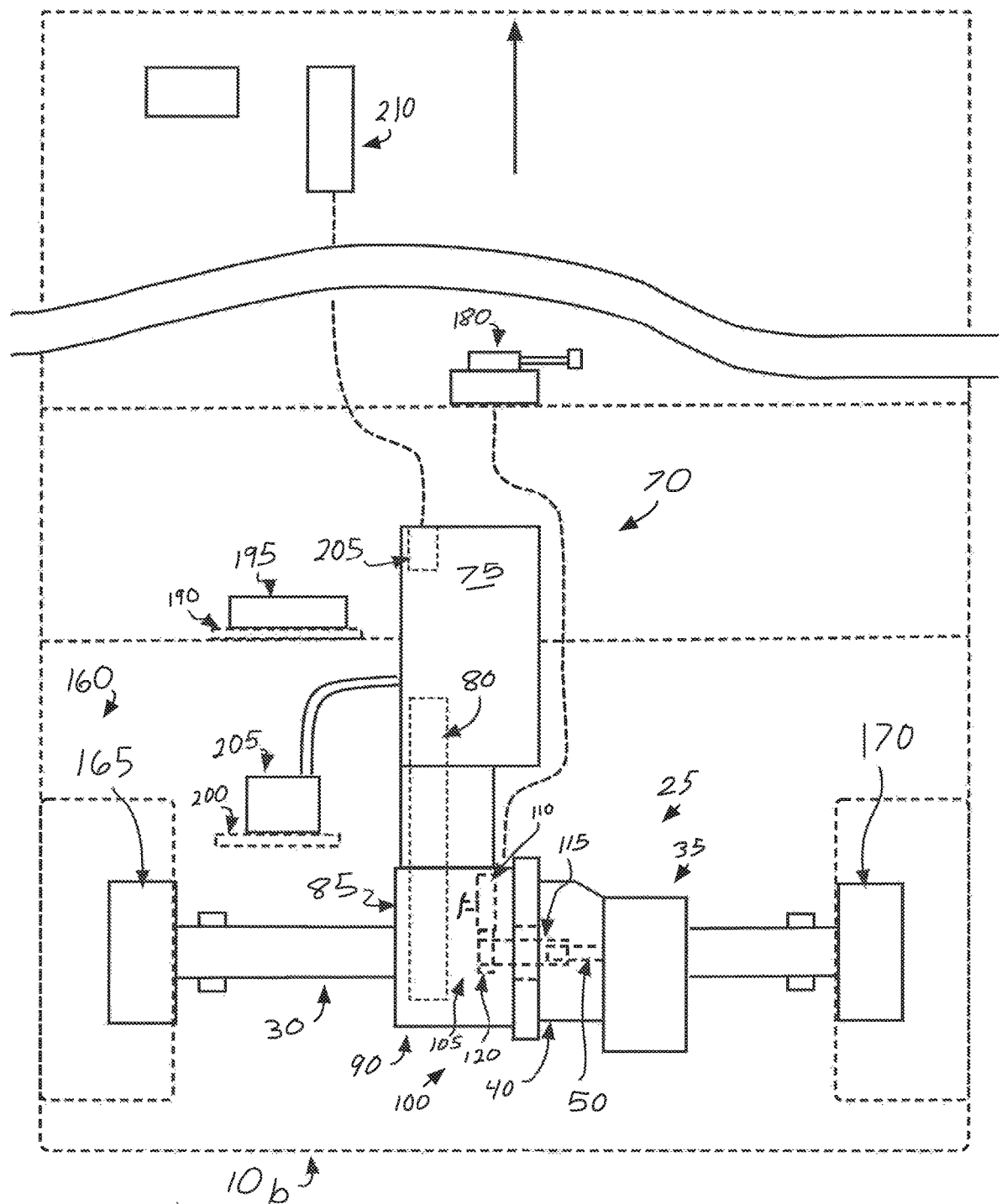
FIG. 3 is a simplified schematic representation of a PTV in a repowered configuration that is powered with an internal combustion engine.

Referring now to FIG. 3, after repowering to convert electric motor-powered PTV 10a to engine-powered PTV 10b, transaxle 25 is in a second position with a second orientation. In this second orientation, the transaxle input shaft 50 faces a second direction transversely with respect to a centerline of the PTV 10, shown facing toward a driver side of PTV 10 or opposite as that of electric motor-powered PTV 10a. The reorientation of transaxle 25 is explained in greater detail elsewhere herein.

Still referring to FIG. 3, engine-powered PTV 10b includes power unit 70 that has an ICE 75 that may deliver power to a primary transmission which may be a CVT (continuously variable transmission) 80. CVT 80 may be integral and, for example, fully enclosed within power unit 70. The CVT 80 may have a centrifugal clutch system with a primary clutch driven by ICE 75 and a secondary clutch that is driven by the primary clutch through a belt. The secondary clutch of CVT 80 may deliver power to a downstream geartrain of a gearbox that may also be integrated into power unit 70, shown here as F/R gearbox 85 (forward/reverse gearbox) with a FR gearbox housing segment, represented as FIR gearbox housing 90. Power unit 70 is shown here as a unitized integration of ICE70, CVT 80, and F/R gearbox 85, although it is understood that these various components may be implemented separately as discrete independent components. Regardless of the particular configuration of power unit 70, it may be connected to an adapter system 100.

Still referring to FIG. 3, adapter system 100 is configured to connect power unit 70 to transaxle 25. Adapter system 100 includes an adapter geartrain 105 with an intermediate gear 110 that is rotated within the geartrain in the F/R gearbox 85. Intermediate gear 110 rotates transmission output shaft 115, for example, by a toothed meshing of teeth of intermediate gear 110 with teeth of a transmission output shaft gear 120.

Figure 4:
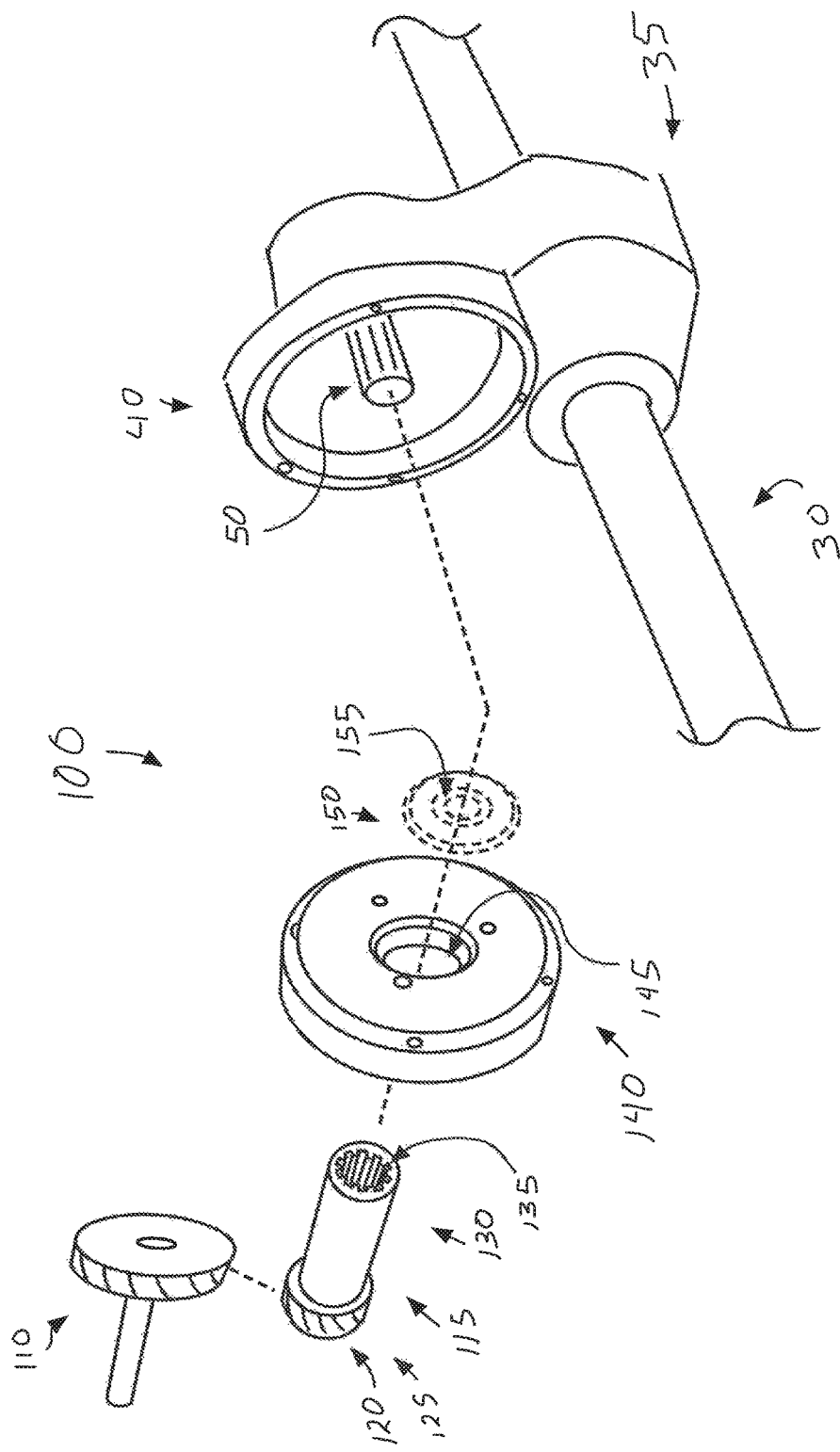
FIG. 4 is an exploded pictorial view of components of the conversion system of FIG. 1.
Figure 5:
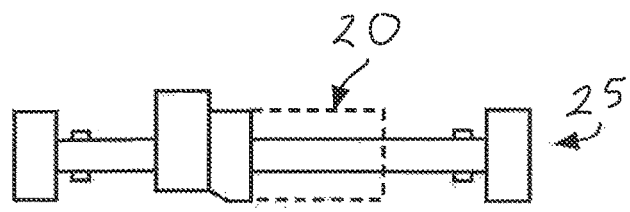
FIGS. 5-8 are simplified schematic representations of a transaxle and various powertrain and conversion system components in different stages of the repowering and conversion process.

Referring now to FIG. 4, output shaft gear 120 is mounted to a first end or input end 125. The intermediate gear 110 is shown with a larger diameter than a diameter of the transmission output shaft gear 120 so the forward/reverse gearbox 85 overdrives the transmission output shaft 115. In this way, power unit 70 can provide an overdrive output ratio. An opposite second end or output end 130 of transmission output shaft 115 delivers power from power unit 70 to transaxle 25. Output end 130 of transmission output shaft 115 has a blind bore that is internally splined and shown as splined bore 135 that provides an internally splined configuration to transmission output shaft 115 that receives transaxle input shaft 50. Transmission output shaft 115 is locked into rotational unison with transaxle input shaft 50 through the splined engagement of the internal splines of transmission output shaft 115 and the external splines of transaxle input shaft 50. Transaxle input shaft 50 may be recessed within the transaxle housing input section 60, and transmission output shaft 105 may extend into the transaxle housing input section 60 so that the shaft coupling may occur entirely within the transaxle housing input section 60.

Still referring to FIG. 4, adapter system 100 further includes adapter plate 140 that interconnects the transaxle housing input section 60 and F/R gearbox housing 90 to each other. Adapter plate 140 defines an adapter plate passage 145 through which the transmission output shaft 115 extends, A bearing holder 150 of adapter plate 140 holds bearing 155, which concentrically and rotationally supports transmission output shaft 115.

Figure 6:
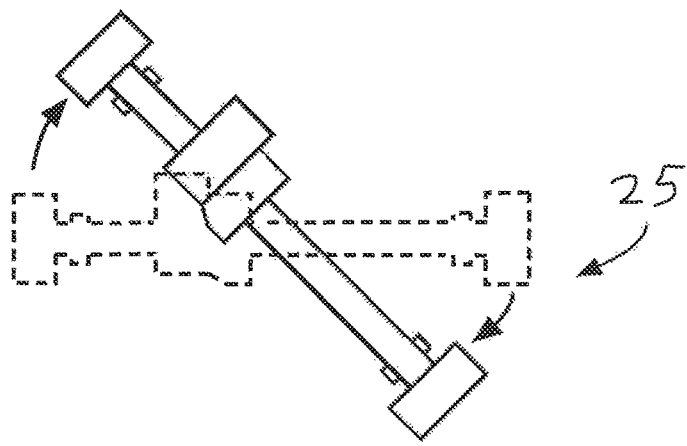
Figure 7:
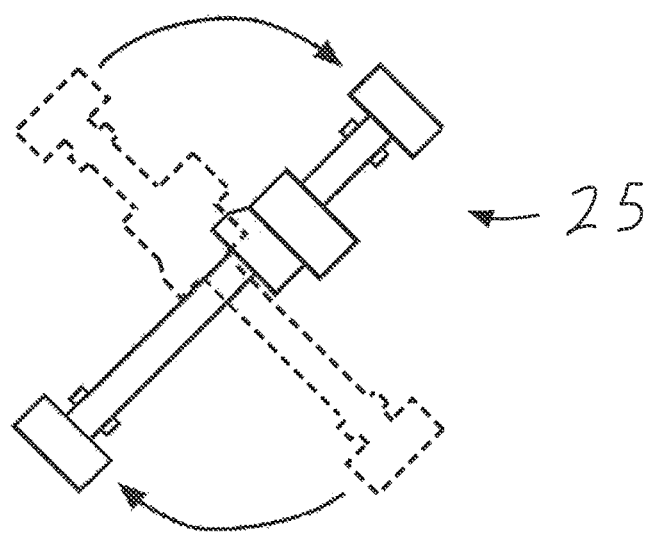
Figure 8:
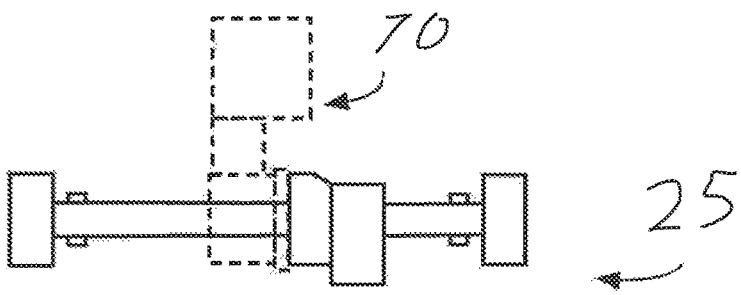

Referring to FIGS. 5-8 and with background reference to FIGS. 2-4 as showing various components as systems, while repowering PTV 10 to convert it from electric motor-powered PTV 10a (FIG. 2) to engine-powered PTV 10b (FIG. 3), the process includes removing electric motor 20 from transaxle 25. This may be done before removing transaxle 25 from PTV 10, From its first or original orientation, transaxle 25 is removed from PTV 10, which may be done by removing transaxle 25 in one piece, along with its axle. This is represented as the orientation shown in FIG. 5. Transaxle 25 is reoriented to its second position or orientation. This may be done by rotating transaxle 25 in a yaw-direction about a vertical axis, as represented in FIGS. 6-7. The reorientation of transaxle 25 changes the direction at which the outer end of transaxle input shaft 50 by 180-degrees. After transaxle 25 is repositioned by its rotational reorientation to the second position or orientation (FIG. 8), power unit 70 is connected to it. As part of installation preparation and depending on the particular configuration of power unit 70, if necessary, intermediate gear 110 and transmission output shaft gear 120 are installed in F/R gearbox 85. Adapter plate 140 is connected to F/R gearbox housing 90. An engine unit mounting member may be independently attached to the chassis of PTV 10. The power unit 70 and its mounting member may be pivoted about the axle of transaxle 25 to align corresponding connectors or mounting features of the power unit 70 and transaxle 25 for making the connection, such as aligning and engaging adapter plate 140 with electric motor mounting-arrangement 40. Fasteners or other hardware is used to connect adapter plate 140 with electric motor-mounting arrangement 40, which correspondingly connects transaxle housing input section 60 and FIR gearbox housing 90 to each other through adapter system 100.

Referring again to FIGS. 2-3, a brake system 160 may be removed and reinstalled in the same orientation with respect to the chassis of PTV 10 even though the transaxle 25 is rotated to an opposite orientation. Brake system 160 includes a left brake unit 165 arranged at the driver side and a right brake unit 170 arranged at the passenger side of the personal transport vehicle 10. The brake system 160 is reinstalled on the same side(s) with respect to PTV 10 as it was before reorienting the transaxle 25, with the left brake unit 165 at the driver side and the right brake unit 170 at the passenger side of personal transport vehicle 10.

Referring again to FIG. 3, transmission control 180, such as a forward/reverse selector, is installed for selecting the rotational direction of transmission output shaft 115 to provide the forward and reverse travel directions, Engine oil cooling system mount 190 may be installed to support, for example, an oil cooler 195 of an oil cooling system from the chassis of PTV 10. Exhaust system mount 200 may be installed to support, for example, a muffler 210 of an exhaust system from the chassis of PTV 10. An engine load control 205 of ICE 75 is connected to the electric motor speed control so that the engine speed is controlled with the existing accelerator pedal 210.

Many changes and modifications could be made to the invention without departing from the spirit thereof. The scope of these changes will become apparent from the appended claims.

What is claimed is:

1. A method of repowering a personal transport vehicle to convert the personal transport vehicle from electric motor-powered to internal combustion engine-powered, the method comprising:

removing an electric drive motor from an electric motor-powered personal transport vehicle;

removing a transaxle from the personal transport vehicle, wherein the transaxle defines a first position as an original orientation for receiving power from the electric drive motor;

reorienting the transaxle to a second position as a repowered orientation; wherein reorienting the transaxle includes rotating the transaxle in a yaw-direction about a vertical axis so that the transaxle faces an opposite direction after the reorienting;

connecting a power unit that includes an internal combustion engine to the transaxle when the transaxle is in the second position; and supporting the power unit from a chassis of the personal transport vehicle.

2. The method 1, further comprising:

removing a brake system, wherein the brake system includes a left brake unit arranged at a driver side of the personal transport vehicle and a right brake unit arranged at a passenger side of the personal transport vehicle; and reinstalling the brake system on the same side as it was before reorienting the transaxle with the left brake unit at the driver side of the personal transport vehicle and the right brake unit at the passenger side of the personal transport vehicle.

3. The method of claim 1, further comprising:

installing transmission controls for selecting a transmission output shaft rotational direction for providing forward and reverse travel directions of the personal transport vehicle.

4. The method of claim 1, further comprising:

installing at least one of:
an engine oil cooling system mount; and
an exhaust system mount.

5. The method of claim 1, further comprising:

connecting an engine load control to an electric motor speed control so that the engine speed is controlled with a common accelerator pedal as used for controlling electric motor speed.

* * * * *